(12) United States Patent
Chang et al.

(10) Patent No.: US 8,396,431 B2
(45) Date of Patent: Mar. 12, 2013

(54) MOBILE STATION TRAFFIC STATE ANTENNA TUNING SYSTEMS AND METHODS

(75) Inventors: Henry Chang, San Diego, CA (US); Jorge Fabrega-Sanchez, San Diego, CA (US); Gregory Poilasne, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 2456 days.

(21) Appl. No.: 11/062,239

(22) Filed: Feb. 17, 2005

(65) Prior Publication Data

US 2006/0183431 A1    Aug. 17, 2006

(51) Int. Cl.
*H04B 1/40* (2006.01)

(52) U.S. Cl. .......................................... 455/87; 455/522

(58) Field of Classification Search ................ 455/575.5, 455/575.6, 565, 77, 87
See application file for complete search history.

(56) References Cited

U.S. PATENT DOCUMENTS

| | | | |
|---|---|---|---|
| 5,103,459 A | 4/1992 | Gilhousen et al. | |
| 5,982,759 A | 11/1999 | Jo et al. | |
| 6,052,566 A | 4/2000 | Abramsky et al. | |
| 6,070,075 A | 5/2000 | Kim | |
| 6,144,650 A | 11/2000 | Watanabe et al. | |
| 6,188,906 B1 | 2/2001 | Lim et al. | |
| 6,198,441 B1 | 3/2001 | Okabe et al. | |
| 6,298,051 B1 | 10/2001 | Odenwalder et al. | |
| 6,397,043 B1 * | 5/2002 | Kang | 455/69 |
| 6,647,273 B2 * | 11/2003 | Parssinen et al. | 455/522 |
| 6,657,595 B1 | 12/2003 | Phillips et al. | |
| 6,710,651 B2 | 3/2004 | Forrester | |
| 6,714,526 B2 | 3/2004 | Wei et al. | |
| 6,741,861 B2 | 5/2004 | Bender et al. | |
| 6,754,251 B1 | 6/2004 | Sriram et al. | |
| 6,765,540 B2 * | 7/2004 | Toncich | 343/860 |
| 6,785,249 B2 | 8/2004 | Soliman | |
| 6,788,685 B1 | 9/2004 | Holtzman et al. | |
| 7,047,046 B2 * | 5/2006 | Hoffmann et al. | 455/562.1 |
| 2002/0149535 A1 * | 10/2002 | Toncich | 343/860 |
| 2003/0124983 A1 * | 7/2003 | Parssinen et al. | 455/69 |
| 2004/0009754 A1 | 1/2004 | Smith et al. | |
| 2004/0193971 A1 * | 9/2004 | Soong et al. | 714/704 |
| 2004/0222925 A1 | 11/2004 | Fabrega-Sanchez et al. | |
| 2004/0252724 A1 | 12/2004 | Jou | |
| 2005/0026573 A1 * | 2/2005 | Cho | 455/114.2 |
| 2005/0095998 A1 * | 5/2005 | Toncich | 455/129 |

FOREIGN PATENT DOCUMENTS

EP    1182787    2/2002

* cited by examiner

*Primary Examiner* — Tu X Nguyen

(57) ABSTRACT

Wireless communication device antenna matching circuit tuning responsive to power control signals, and, optionally, responsive to received signal quality indicators in a traffic channel. Systems and methods are provided that increase the antenna efficiency in either the transmit frequency or the receive frequency as needed, based on fading and environmental conditions, non-ideal antenna efficiency balance, mobile station forward versus reverse link usage and system forward versus reverse link usage. The antenna efficiency may be changed incrementally or may be optimized completely for the transmit frequency or the receive frequency. The re-balancing is accomplished by tuning the antenna matching circuit. One way to tune the antenna matching circuit is to apply a voltage to a ferro-electric capacitor in the matching circuit, thereby changing the capacitance of the ferro-electric capacitor, thereby changing the impedance of the antenna system.

21 Claims, 3 Drawing Sheets

MOBILE STATION TRAFFIC STATE ANTENNA TUNING SYSTEMS AND METHODS

RELATED APPLICATIONS

This application relates to the following two U.S. patent applications filed on the same day, having the same inventors, and assigned to the assignee of the present invention, and which are hereby incorporated herein by reference: "MOBILE STATION ACCESS AND IDLE STATE ANTENNA TUNING SYSTEMS AND METHODS", Ser. No. 11/062,242, and "MOBILE STATION ACQUISITION STATE ANTENNA TUNING SYSTEMS AND METHODS", Ser. No. 11/062,214.

BACKGROUND OF THE INVENTION

1. Field of the Invention

The invention relates generally to wireless electronic communications and more particularly to antenna tuning systems and methods.

2. Background

In a communication system with different transmit and receive frequencies, mobile station antenna efficiency is a balance between optimization for the transmit frequency and optimization for the receive frequency. Under typical operating conditions, the typical antenna efficiency balance allows for the best use of the transmit and receive resources. However, commonly, conditions occur in which the typical antenna efficiency balance is not preferred. In such conditions, it can be said that the forward and reverse links are not balanced.

The forward link is the communication link for data (voice data or other data) travelling from a base station transmitter to a mobile station receiver. The reverse link is the communication link for data (voice data or other data) from the mobile station transmitter to the base station receiver.

A first example of a forward and reverse link imbalance is when fading conditions may reduce either the forward link or the reverse link reception. In a second example, the antenna efficiency balance between the transmit and receive frequencies may not be ideal, as a result of some slowly changing parameter or even as a result of a fixed parameter. For example, the antenna matching circuit, or some other hardware component, may have been manufactured or calibrated in a way that provides a non-ideal balance between the transmit and receive frequencies. Alternatively, the antenna efficiency balance may become non-ideal under certain temperature conditions, such as, for example, when high temperatures result from extended continuous use.

In a third example, the forward and reverse link may become imbalanced as a result of performance reduction caused by environmental changes around the mobile station. For example, the antenna may be covered by the user's hand or the mobile station may be placed on a metallic table.

In a fourth example, the typical antenna efficiency balance may not be preferred because of the forward and reverse link loading of the communication system at a particular time. For example, the mobile station may be transmitting or receiving only for some time periods. As another example, the wireless communication system may be overloaded in the forward link relative to the reverse link at a particular time. The communication system might be overloaded in the forward link if, for example, data is being transmitted from a base station simultaneously to many users, but relatively few users are transmitting data to the base station.

SUMMARY OF THE INVENTION

The balance between the forward and reverse link is improved by tuning an antenna matching circuit responsive to reverse power control signals (bits), and optionally, responsive to received signal quality indicators, such as received signal strength indicator (RSSI) and forward frame error rate (FER), or optionally, responsive to forward power control signals (bits). When the forward link is degraded due to fading conditions, the antenna efficiency is increased in the receive frequency, even though doing so may degrade the antenna efficiency in the transmit frequency. Conversely, when the reverse link is degraded due to fading conditions, the antenna efficiency is increased in the transmit frequency, even though doing so may degrade the antenna efficiency in the receive frequency.

When a non-ideal antenna efficiency balance between transmit and receive occurs, the balance is restored by re-tuning the antenna efficiency. When mobile station or system reverse and forward link usage is imbalanced, the antenna efficiency balance can be shifted toward either the transmit or receive frequency, depending upon where increased efficiency is needed. For example, if a mobile station is transmitting only, the antenna efficiency balance can be shifted toward the transmit frequency. The antenna efficiency may be shifted a small amount or a large amount toward the transmit frequency. The antenna efficiency may even be optimized completely for the transmit frequency. As another example, if the communication system is heavily loaded on the forward link compared to the reverse link, the antenna efficiency balance of the mobile station may be shifted toward the receive frequency band.

The antenna efficiency balance is tuned by tuning the antenna matching circuit. One way to tune the antenna matching circuit is to apply one or more voltages to one or more ferro-electric capacitors in the matching circuit, thereby changing the capacitance of the ferro-electric capacitor(s), thereby changing the impedance of the antenna system (antenna and matching circuit).

Other aspects, advantages, and novel features of the invention will become apparent from the following Detailed Description of Preferred Embodiments, when considered in conjunction with the accompanying drawings.

BRIEF DESCRIPTION OF THE DRAWINGS

Preferred embodiments of the present inventions taught herein are illustrated by way of example, and not by way of limitation, in the figures of the accompanying drawings, in which.

DETAILED DESCRIPTION

Figure 1:
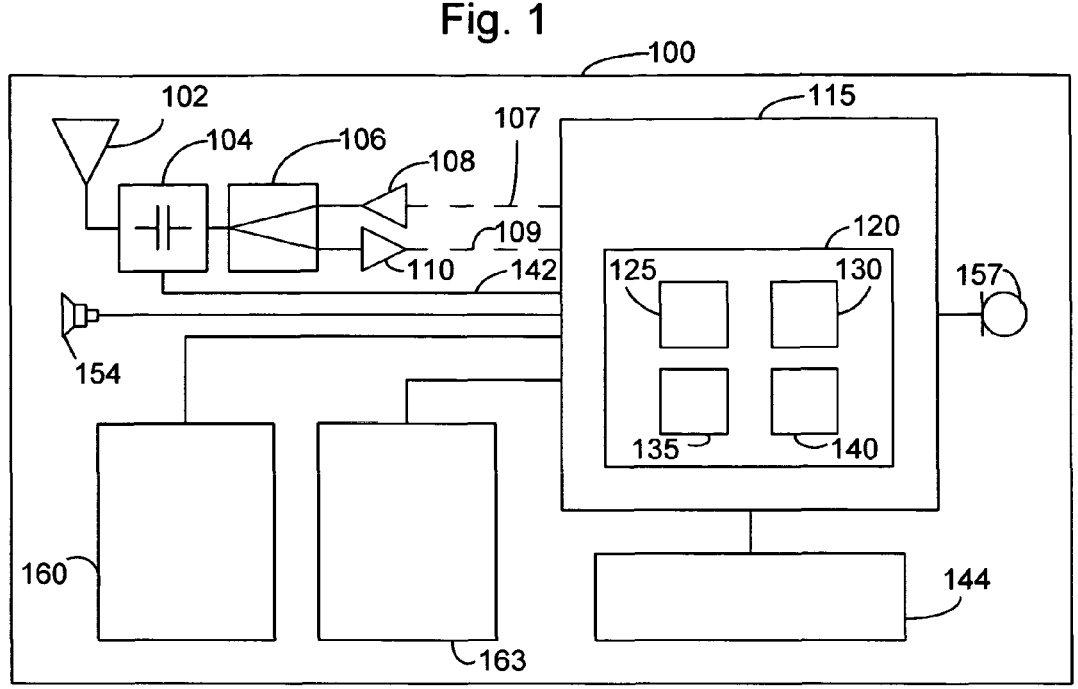
FIG. 1 is a block diagram illustrating a wireless communication device tuning an antenna match responsive to a reverse power control signal.

FIG. 1 is a block diagram illustrating a wireless communication device tuning an antenna match responsive to a power control signal. Wireless communication device 100 may be a cellular telephone for communicating with a base station, such as, for example, a code division multiple access (CDMA) mobile station. However, wireless communication device 100 may be any wireless communication device that receives power control signals from the communication system and communicates in at least two frequency bands. U.S. Pat. No. 6,788,685 B1 to Holtzman, which is hereby incorporated by reference, describes methods and systems for controlling transmission power in a closed loop power control system.

Wireless communication device 100 includes antenna 102 for radiating electromagnetic signals into the air and for receiving electromagnetic signals from the air. Only one antenna 102 is shown, though multiple antennas are possible. Antenna 102 is connected to tunable matching circuit 104. Tunable matching circuit 104 may be a ferro-electric tunable matching circuit as described in any of co-pending U.S. patent application Ser. Nos. 10/899,218; 10/899,278; 10/899,285; each filed Jul. 26, 2004; and Ser. No. 10/806,763, filed Mar. 22, 2004, which are each hereby incorporated by reference. Alternatively, tunable antenna matching circuit may be tunable by means of a varactor diode, micro-electrical mechanical switches switching various reactive components in and out of matching circuit 104, or by any other convenient means of tuning matching circuit 104. Thus, tunable matching circuit 104 may be a switchable matching circuit.

Matching circuit 104 is connected to duplexer 106. Duplexer 106 duplexes transmit and receive signals. Alternatively, duplexer 106 could be a switch for duplexing transmit and receive signals. Duplexer 106 is connected to transmit path 107, represented by power amplifier (PA) 108. Duplexer 106 is also connected to receive path 109, represented by low noise amplifier (LNA) 110. Transmit path 107 and receive path 109 are connected to processor 115. Processor 115 may be a Qualcomm™ mobile station modem (MSM), such as a commercially available Qualcomm™ 6000 series MSM, for CDMA communications.

Processor 115 includes controller 120. Processor 115 demodulates the received signal on receive path 109. Reverse power control bits are included in the received signal. That is, a base station (not shown) transmits power control bits to mobile station 100. User interface devices, such as speaker 154, microphone 157, display 160 and keypad 163 are also connected to processor 115.

In one embodiment, the mobile station 100 communicates in an IS-2000 cellular communication system. See TIA/EIA/IS-2000, New York, N.Y., USA. The transmit power from the mobile station is determined by the summation of two components, the open loop power control and the closed loop power control. In the open loop power control the mobile station uses the total received power at the mobile station to adjust its own transmit power; the stronger the received power, the lower the mobile station's transmitter power. Reception of a strong signal from the cell site indicates that the mobile station is either close to the cell site or has an unusually good path to the cell site.

The open loop power control mechanism provides for very rapid response over a period of just a few microseconds. In the closed-loop power control (typically used in the traffic state), the base station sends reverse power control bits on the forward power control subchannel to the mobile station to adjust the transmit power of the mobile station in addition to the transmit power determined by open loop power control. Closed-loop power control takes into account sudden degradation and improvement of signals that only affects the reverse link. It also takes into account the independence of Rayleigh fading on the forward link and the reverse link which the mobile station cannot estimate. Ultimately, the closed-loop power control adjustments are limited by the power amplifier and the antenna efficiency of the mobile station on the reverse link. In the closed-loop power control, the reverse power control bit received at the mobile may be accumulated as a transmit gain adjust signal in the mobile station, because the base station is telling the mobile station how to adjust the transmit gain of the mobile station.

The base station sends transmit gain adjust signals (also known as power control bits) to the mobile station typically every 1.25 milliseconds (ms). The transmit gain adjust signals are summed together. The transmit gain adjust signals typically take the form of up and down signals. The base station tells the mobile station to turn its transmit power up one unit or down one unit. The reverse power control bit step sizes are typically 1.0 dB. The mean pilot channel output power in dBm is governed by Equation 1, which follows:

$$\text{mean pilot channel output power (dBm)} = -\text{mean in input power} + \text{offset power} + \text{interference correction} + ACC_{13} \text{ CORRECTIONS} + RLGAIN_{13} \text{ ADJs} + \text{sum of all closed loop power control corrections.} \quad \text{Equation 1}$$

The following are definitions of the terms in Equation 1, above:

mean pilot channel output power: the average transmit power of the reverse pilot channel;

mean input power: the total received calorimetric power measured in a specified bandwidth at the antenna connector, including all internal and external signal and noise sources;

offset power: the turn around constant (expressed without units) used by the mobile station to determine the transmit power of the mobile station in relation to the received power at the mobile station's antenna connector; the offset power is defined in TIA/EIA/IS-2000 according to a particular modulation scheme and band class (frequency) of operation; as an example, in the cellular band (800 MHz), the offset power is either −73 or −81.5 depending on which modulation scheme is used;

interference correction: min(max(-7-ECIO, 0), 7), where ECIO is the Ec/Io (dB) per carrier of the strongest active set pilot, measured within 500 ms; the mobile station determines Ec/Io (dB) by taking the ratio of the received pilot energy per chip, Ec, to the total received power spectral density (noise and signals), of at most k usable multipath components, where k is the number of demodulating elements supported by the mobile station; the mobile determines the total received power spectral density, Io, over 1.23 MHz;

$ACC_{13}$ CORRECTIONS: a correction factor which includes additional power offsets determined by the base station and sent as overhead messages to all mobile stations (i.e. $NOM_{13}$ PWR, $INIT_{13}$ PWR, $NOM_{13}$ $PWR_{13}$ EXT);

$RLGAIN_{13}$ ADJs: Gain adjustment applied to the Traffic Channel output power relative to the transmission power on the Access Channel, Enhanced Access Channel, or Reverse Common Control Channel; and sum of all closed loop power control corrections: the sum of all the reverse power control bits send by one or more base stations in the mobile station's active set.

Advantageously, the sum of all transmit gain adjust signals is kept by controller 120 or elsewhere in processor 115. The sum will be referred to herein as TGA. TGA is an input to a method or table, as will be described in detail below.

Another input used by controller 115 is received signal strength indicator (RSSI). RSSI is equal to received power multiplied by the combined pilot energy per chip (Ec) divided by the total received power spectral density (noise, signal and interference), known as $I_o$.

Controller 120 may include one or more of main input/output table, 125, optimum transmit (Tx) table 130, optimum receive (Rx) table 135, and transmit/receive (Tx/Rx) table 140. Controller 120 Tables 125, 130, 135 and 140 are used to control antenna matching circuit 104.

Main input/output table, e.g., Table 1, below, shows examples of transmit gain adjust (TGA) and received signal strength indicator (RSSI) inputs and corresponding antenna matching outputs. There are many other possibilities. Table 1 is shown merely as an example. Particularly, the values in Table 1 may be optimally determined by experiment, and other rows may be added to Table 1 as a result of experimental determinations.

TABLE 1

| TGA | RSSI (dBm) | Output |
|---|---|---|
| >=7 | >−80 | Optimum Tx |
| 5 to 6 | >−85 | Move 3 bins toward Tx |
| 4 | >−85 | Move 2 bins toward Tx |
| 3 | >−85 | Move 1 bin toward Tx |
| −5 to −6 | <−85 | Move 1 bin toward Rx |
| <=−7 | <−90 | Optimum Rx |

Controller 120 keeps track of the sum of all of the transmit gain adjust commands received from the base station. The TGA column of Table 1 shows values of the sum of all of the transmit gain adjust commands. If, for example, TGA is greater than or equal to seven and RSSI is greater than −80 dBm, then the mobile station sets its antenna matching circuit to the optimum Tx setting. The optimum Tx setting is based on the transmit channel being used and the temperature. The optimum transmit setting may be stored in a table like Table 2, below.

TABLE 2

| Channel or Group | Temperature (° C.) | Matching Circuit Setting (Volts) |
|---|---|---|
| 1 | <0 | 0.52 |
| 1 | 0 to 35 | 0.26 |
| 1 | 35 to 60 | 0.12 |
| 1 | >60 | 0.0 |
| 2 | <0 | 0.80 |
| 2 | 0 to 35 | 0.64 |
| 2 | 35 to 60 | 0.50 |
| 2 | >60 | 0.38 |

In Table 2, the voltage decreases with increasing temperature because FE capacitors generally decrease their capacitance with both temperature and voltage. To compensate for increased temperature the voltage is decreased. Further, in Table 2, the voltage increases with increasing channel or group number. The relationship between voltage and channel or group number depends on the particular matching circuit topology chosen and the position of the FE capacitors in the matching circuit. See, for example, the above-referred patent application Ser. Nos. 10/899,218; 10/899,278; 10/899,285; and 10/806,764.

Table 2 is stored in a memory of the mobile station, and referred to whenever called by the output of Table 1. In Table 2, only two transmit channels are shown for illustration. In practice many more channels will be stored. Further, the channel designations shown in Table 2 may not be actual transmit channels. Instead, the channel designations may refer to groups of channels. For example, the lowest 200 channels may be designated as channel (or group) 1 in Table 2. The second group of 200 channels may be designated as channel (or group 2) in Table 2. Thus, the lowest 200 channels may have the same matching circuit setting, for any given temperature.

Thus, to continue the example above, if TGA is 7 and RSSI is greater than −80 dBm, controller 125 determines from Table 1 that optimum Tx setting should be used. Controller looks optimum Tx setting up in Table 2, based on the temperature and the current transmit channel or group of channels. If, for example, the current Tx channel is channel 1 and the current temperature is 30° C., then controller 125 determines, based on Table 2, that the matching circuit setting is 0.12 Volts. Actual values for the matching circuit settings in Tables 2-4 will be determined experimentally.

Processor 115 is connected to matching circuit 104 by control line 142. Control line 142 supplies a control voltage to matching circuit 104, such as, for example, 0.12 Volts in the above example. A separate voltage source (not shown) may be provided for supplying the control voltage to matching circuit 104. Or, as shown, the control voltage is supplied by processor 115 directly, responsive to the output of Table 2, 3 or 4, as determined by controller 120. Multiple control lines may be used to control multiple matching circuits or multiple matching circuit components, such as multiple FE capacitors.

Controller 120 is shown internal to processor 115. In practice, controller may be external or partially external to processor 115. A separate controller may be provided. For example, a controller may be a separate integrated circuit or may include one or more discrete components. In that case, processor 115 would provide the power control bits or TGA to controller externally. Additionally, RSSI may be provided to controller externally, that is, directly from an RSSI detector (not shown) to controller or from processor to controller.

Processor 115 is connected to memory 144. Tables 1-4 are shown internal to controller 120, which is shown internal to processor 115. Tables 1-4 may be stored in memory 144. Tables 1-4 are shown internal to controller 120 for illustration, since controller uses Tables 1-4 to look up matching circuit settings.

Optimum receive matching circuit settings are stored in memory 144 in a table such as Table 3, below, and referred to whenever the output of Table 1 calls for optimum receive settings.

TABLE 3

| Channel or Group | Temperature (° C.) | Matching Circuit Setting (Volts) |
|---|---|---|
| 1 | <0 | 2.52 |
| 1 | 0 to 35 | 2.26 |
| 1 | 35 to 60 | 2.12 |
| 1 | >60 | 2.0 |
| 2 | <0 | 2.60 |
| 2 | 0 to 35 | 2.44 |
| 2 | 35 to 60 | 2.30 |
| 2 | >60 | 2.18 |

Table 3 is stored in a memory of the mobile station, and referred to whenever called by the output of Table 1. In Table 3, only two receive channels are shown for illustration. In practice many more channels will be stored. Further, the channel designations shown in Table 3 may not be actual channels. Instead, the channel designations may refer to groups of channels. For example, the lowest 200 channels may be designated as channel (or group) 1 in Table 3. The second group of 200 channels may be designated as channel (or group 2) in Table 3. Thus, the lowest 200 channels may have the same matching circuit setting, for any given temperature.

Another table, such as Table 4, stores matching circuit settings for moving stepwise toward better transmit matching or stepwise toward better receive matching. Stepwise movement is used when the output of Table 1 is something other than Optimize Tx or Optimize Rx. For example, according to Table 1, if TGA is 5 or 6 and RSSI is >85 dBm, then the mobile station tunes the antenna matching circuit 3 steps in the transmit direction (e.g., lower frequency in the U.S. CDMA, higher frequency in Japan CDMA). An example Table 4 is shown below. As is the case for Tables 1-3, experiment will give 4.

TABLE 4

| Bin Number | Matching Circuit Setting (Volts) |
| --- | --- |
| 1 | 0.0 |
| 2 | 0.13 |
| 3 | 0.26 |
| 4 | 0.38 |
| 5 | 0.50 |
| 6 | 0.62 |
| 7 | 0.73 |
| 8 | 0.83 |

Table 4 does not include temperature as a parameter. Temperature may be included, increasing the complexity and accuracy of Table 4. Further, only eight bins are shown in Table 4. In practice, many more bins are recommended.

Figure 2:
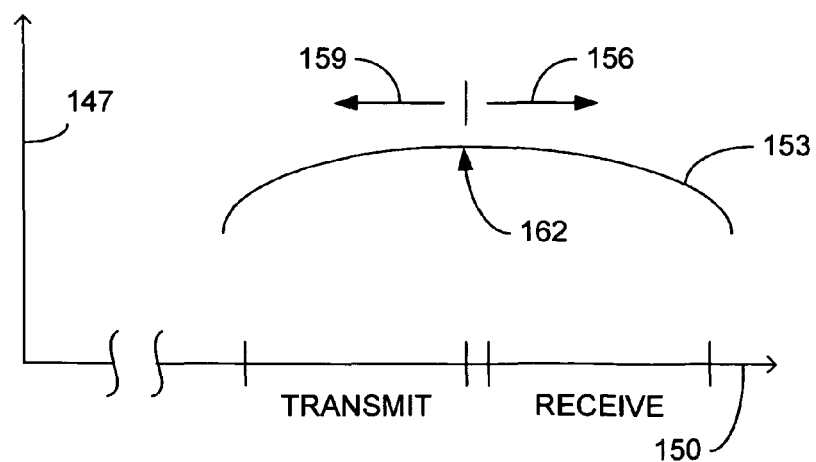
FIG. 2 is a plot illustrating a tunable antenna efficiency.

As described above, controller 120 determines a matching circuit setting for matching circuit 104. FIG. 2 is a plot illustrating a tunable antenna efficiency which can be tuned responsive to the determined matching circuit setting. Antenna efficiency 147 is plotted against frequency 150. An example antenna efficiency 153 is shown as curve 153. Antenna efficiency 153 can be tuned by tuning matching circuit 104. As matching circuit 104 is tuned, curve 153 can be moved to higher or lower frequencies, as shown by arrows 156 and 159. As described in the above referenced copending U.S. patent application Ser. Nos. 10/899,278 and 10/899,218, curve 153 may be tuned to provide maximum efficiency for the currently used transmit and receive channels. Further, curve 153 is tuned responsive to commands from controller 120, based on Tables 1-4.

For example, if Table 1 calls for an optimum Tx setting, controller retrieves the optimum Tx setting from Table 2, and tunes curve 153, so that peak 162 is positioned at the frequency corresponding to the current Tx channel or group of channels and the current temperature. Advantageously, the antenna efficiency is improved in the current Tx channel when improved Tx efficiency is necessary. In such a case, the Rx antenna efficiency will be degraded, but this occurs at a time when Rx antenna efficiency is not needed. As described above, the optimum Tx matching circuit efficiency is selected only when the reverse link (transmission from the mobile station) is doing poorly and the forward link (reception a the mobile station) is doing well. The reverse link and the forward link are rebalanced at least to some extent. System resources are more optimally utilized.

As described above with respect to Tables 1 and 3, if the reverse link is doing well and the forward link is doing poorly, an optimum Rx matching circuit setting will be selected from Table 3. Matching circuit 104 is tuned to move peak 162 of curve 153 to the frequency of the current Rx channel or group of channels.

As described above with respect to Tables 1 and 4, if a shift in matching circuit setting is called for other than an optimum Tx or Rx setting, then a matching circuit setting will be selected from Table 4. Controller 120 keeps track of which bin the matching circuit setting is currently in. Then, when Table 1 calls for a shift based on Table 4, controller 120 looks up the new matching circuit setting in Table 4, based on the current bin, the number of bins to move and the direction (Tx or Rx). For example, if the current matching circuit setting is 0.13 Volts, that is, bin number 2, and Table 1 calls for a shift of 2 bins toward Rx then controller 120 will look up bin 4 (start at bin 2 and add 2 bins for the selected 2 bin shift) and find the matching circuit setting corresponding to bin 4, which in this case is 0.38 Volts. Controller 120 will tune matching circuit 104 by applying 0.38 Volts to matching circuit 104, thereby moving curve 153 two bins toward the Rx frequencies.

Figure 3:
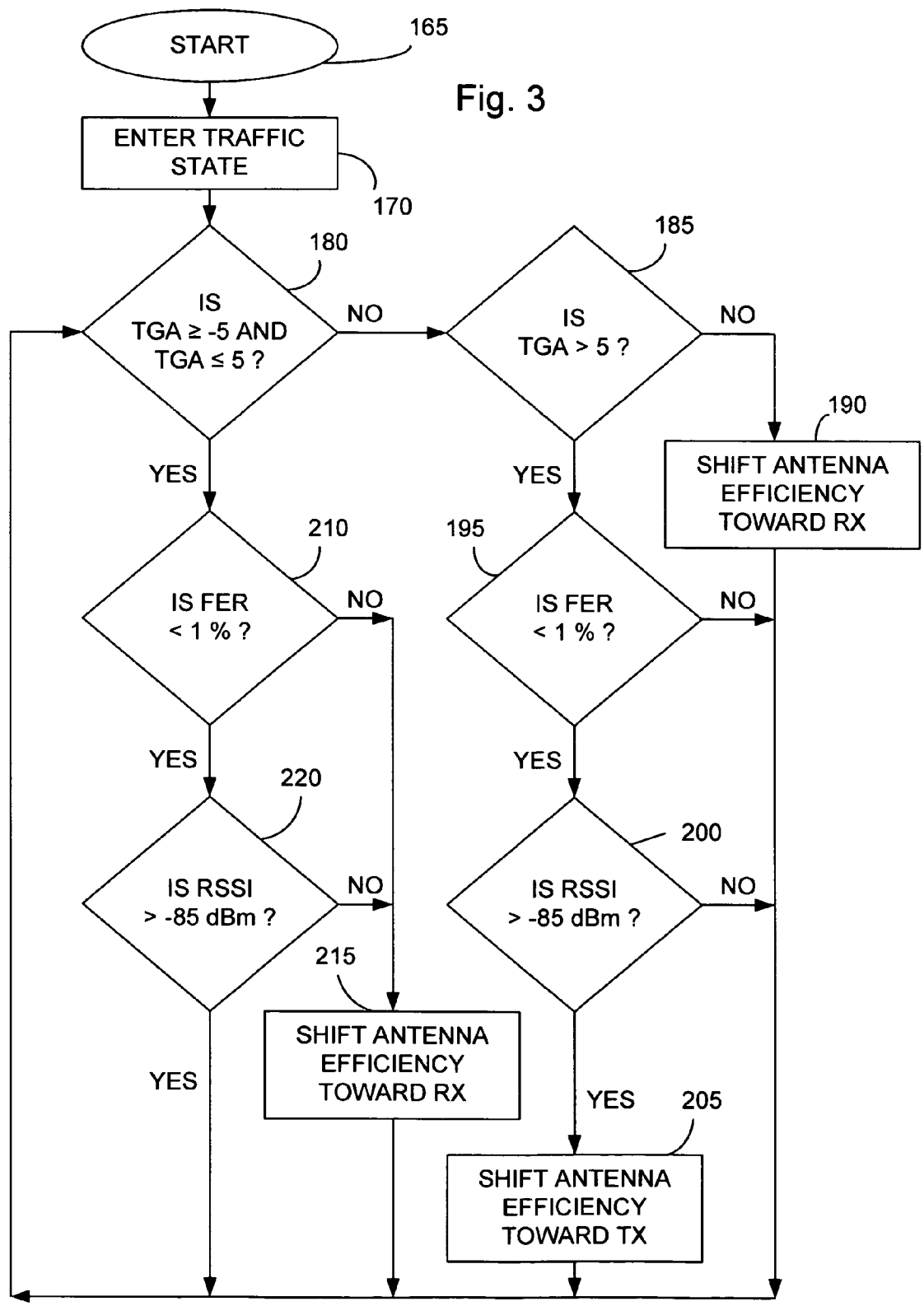
FIG. 3 is a flow chart illustrating a method for tuning an antenna efficiency responsive to a reverse link power control parameter, a received signal strength indicator and a frame error rate.

FIG. 3 is a flow chart illustrating a method for tuning an antenna efficiency (such as curve 153 in FIG. 2) responsive to a reverse link power control parameter (such as TGA), RSSI and FER. The method starts in step 165. In step 170, the mobile station enters a traffic state. Traffic state means that the mobile station is sending or receiving data (which may be voice data or other data) in a traffic channel. In decision step 180, the mobile station determines whether TGA is greater than or equal to −5 and less than or equal to 5. If not, then TGA is outside the range of −5 to 5. When TGA is within the range between −5 and 5 the reverse link in this example is considered to be operating in the desired range. If TGA is below −5 the reverse link is considered to be favorable whereas when TGA is above 5 the reverse link is operating unfavorably.

If TGA is outside the range −5 to 5, the next step is decision step 185, in which the mobile station determines whether TGA is greater than 5. If not, that means TGA is less than −5 and the next step is step 190, in which the antenna efficiency is shifted toward the Rx frequencies. Advantageously, the quality of the forward link is improved, thereby improving the coverage of the cell for the mobile station and the efficiency of network resource use. After step 190, the method returns to step 180.

If TGA is greater than 5, then the next step is decision step 195, in which it is determined whether the FER is less than one percent. If not, the method follows the "NO" path from step 195 and returns to step 180. This indicates that although the reverse link is poor, the forward link is also poor; therefore, adjusting the bias in antenna efficiency in either direction would not be desirable. It is also possible to adjust the matching circuit even if both the forward and the reverse links are doing poorly, but such systems and methods are not described further here.

But if the FER is less than one percent, then the next step is decision step 200, in which it is determined whether RSSI is greater than −85 dBm. If not, the method follows the "NO" path from step 195 and returns to step 180. But if the RSSI is greater than −85 dBm, then the next step is step 205, in which the antenna efficiency is shifted toward the Tx frequencies. After step 205, the method returns to step 180.

Returning to the discussion of step 180, if TGA is in the range of −5 to 5, then the next step is decision step 210, in which it is determined whether the FER is less than one percent. If not, then the next step is step 215, in which the antenna efficiency is shifted toward the Rx frequencies.

But if the FER is less than one percent, then the next step is decision step 220, in which it is determined whether RSSI is greater than −85 dBm. If not, then the next step is step 215, in which, as stated above, the antenna frequency is shifted toward the Rx frequencies. But if RSSI is greater than −85 dBm, then the method returns to step 180. This indicates that both the forward and reverse links are in good condition; therefore, adjusting the antenna efficiency in either direction is not needed.

The shifting of antenna efficiency of steps 190, 205 and 215 can be accomplished by any convenient means, such as, for example, by employing a table like Table 4. Thus, the method described with respect to FIG. 3 may be accomplished using Table 4 and without Tables 1-3. Alternatively, even Table 4 may be avoided if, for example, the matching circuit settings are all equally spaced. Then, the shift steps 190, 205 and 215 may be accomplished without Table 4, merely by changing the matching circuit setting by a predetermined amount in either the Tx or the Rx direction. For example, responsive to steps 190 and 215, 0.1 Volt may be added to the current matching circuit setting, while, responsive to step 205, 0.1 Volt may be subtracted from the current matching circuit setting.

While FER and RSSI are shown in FIG. 3, any received signal quality indicator can be used. Further, the method may include only one received signal quality indicator, such as FER or RSSI, or another received signal quality indicator. For example, symbol error rate (SER) or message error rate (MER) can be used. But if SER is used in a system such as TIA/EIA/IS-95 or IS-2000, then the gain of the decoder will not be accounted for. In CDMA systems, such as those described in TIA/EIA/IS-2000, a convolutional encoder takes a block of bits (e.g., 194 bits, including tail bits) in a 20 ms frame and, depending on the rate of the encoder, produces varying numbers of symbols (e.g., 394, for half rate encoding). Symbol errors are determined prior to running the decoder since the decoder would need, e.g., all 394 symbols, to decode the symbols into the original information bits. Thus, SER could be used. Since SER is faster than FER, SER might be ideal for the case of improving the capacity of the wireless communication system.

Figure 4:
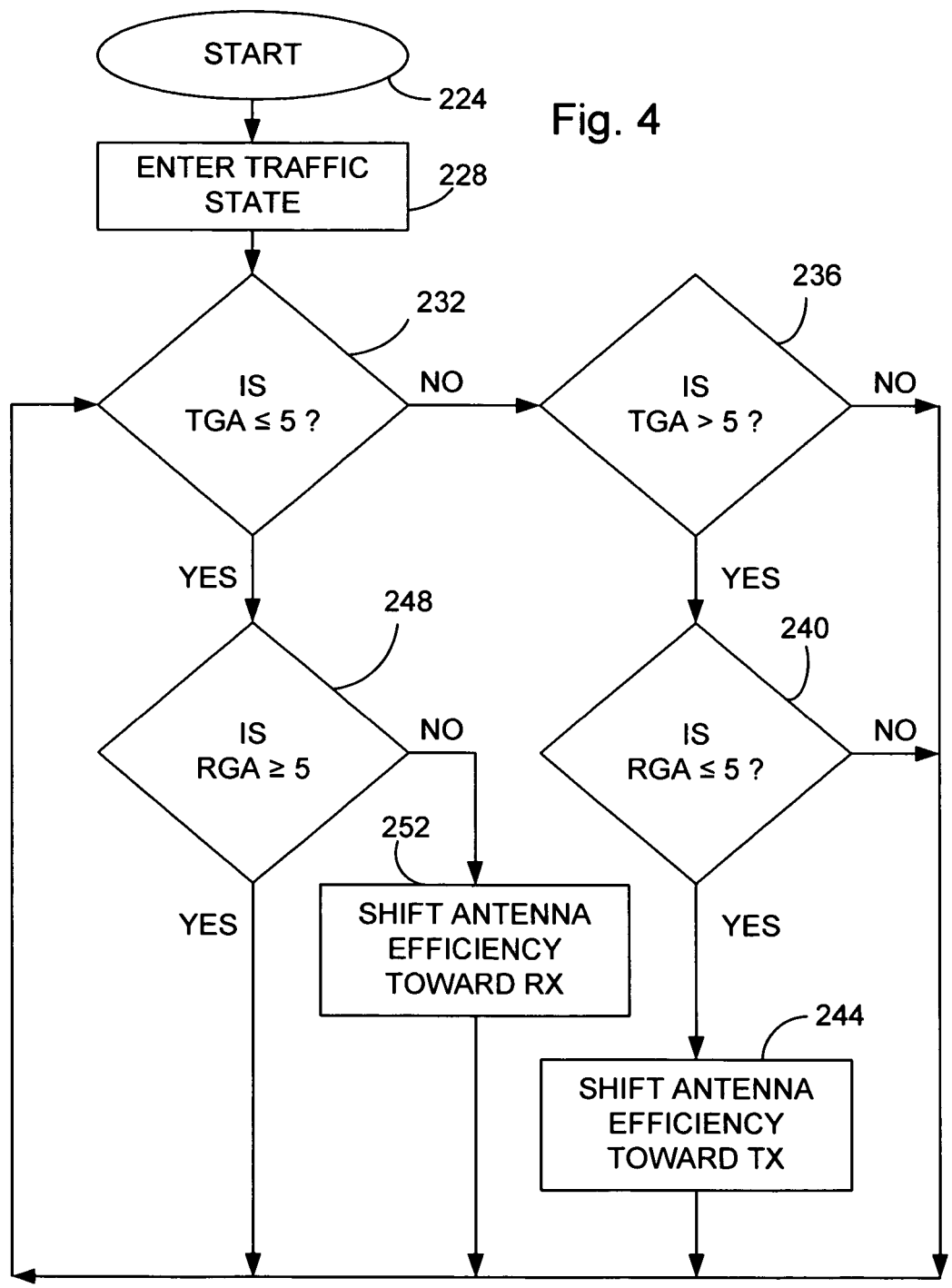
FIG. 4 is a flow chart illustrating a method for tuning an antenna efficiency responsive to a reverse link power control parameter and a forward link power control parameter.

The thresholds (e.g., TGA=5 and −5, RSSI=−85 dBm) shown in FIGS. 3 and 4 may be other numbers than shown. For example, if the mobile stations in a commercial wireless communication network commonly operate with an average TGA of 5, and 5 is considered the appropriate balance for the specific network, then 5 can be added to the TGA thresholds in FIG. 3, such that step 180 would say "IS TGA$\geq$0 AND TGA$\leq$10?". As another example, step 180 could say "IS TGA$\geq$−2 AND TGA$\leq$3?". In other words, the thresholds can be moved closer together or further apart and they can be shifted. Similar changes can be made throughout FIGS. 3-4 and Tables 1-4.

FIG. 4 is a flow chart illustrating a method for tuning an antenna efficiency (such as curve 153 in FIG. 2) responsive to a reverse link power control parameter (such as TGA) and a foward link power control parameter. In some communication systems, the mobile station sends power control signals to the base station. See, e.g., TIA/EIA/IS-2000. In that case, if the mobile station has told the base station to increase its power many times, while the base station has not told the mobile station to increase its power very many times, there may be an imbalance between the forward link and the reverse link. The forward link is poor and the reverse link is good. In that case, antenna efficiency should be tuned toward the Rx frequencies.

Conversely, if the base station has told the mobile station to increase its power many times and the mobile station has not told the base station to increase its power many times, then there may be a different imbalance between the forward link and the reverse link. The forward link is good and the reverse link is poor. In that case, antenna efficiency should be tuned toward the Tx frequencies. FIG. 4 illustrates a method of rebalancing the forward and reverse link, regardless of which is poor and which is good.

The mobile station (in processor 115 or controller 120) keeps track of the sum of all foward link power control signals sent by the mobile station to the base station. This sum is referred to herein as reverse gain adjust (RGA).

The method of FIG. 4 starts in step 224. In step 228, the mobile station enters a traffic state. In decision step 232, it is determined whether TGA is less than or equal to 5. If not, then the next step is decision step 240, in which it is determined whether RGA is less than or equal to 5. If not, then the method returns to step 232. But if RGA less than or equal to 5, then the next step is step 244, in which the antenna efficiency is shifted toward the Tx frequencies. Advantageously, the forward and reverse links are rebalanced at least to some extent. Network resources are used more efficiently. After step 244, the method returns to step 232.

Returning to the discussion of step 232, if TGA is less than or equal to 5, then the next step is decision step 248, in which it is determined whether RGA is greater than or equal to 5. If so, then the next step is step 252, in which the antenna efficiency is shifted toward the Rx frequencies. Advantageously, the forward and reverse links are rebalanced at least to some extent. Network resources are used more efficiently. After step 252, the method returns to step 232. If RGA is not greater than or equal to 5, then the method returns to step 232.

Further, while embodiments and implementations of the invention have been shown and described, it should be apparent that many more embodiments and implementations are within the scope of the invention. Accordingly, the invention is not to be restricted, except in light of the claims and their equivalents.

What is claimed is:

1. A wireless communication device comprising:
   an antenna;
   a tunable antenna matching circuit connected to the antenna and configured to establish an antenna efficiency in response to a control signal;
   a processor connected to the tunable antenna matching circuit and configured to tune the antenna matching circuit in response to a reverse power control signal transmitted from a base station and received at the wireless communication device.

2. The wireless communication device of claim 1, wherein the processor is configured to generate the control signal to increase antenna reception efficiency when the reverse power control signal indicates a non-degraded reverse link.

3. The wireless communication device of claim 1, wherein the processor is configured to generate the control signal to increase antenna transmission efficiency when the reverse power control signal indicates a degraded reverse link.

4. The wireless communication device of claim 3, wherein the processor is configured to generate the control signal to increase antenna transmission efficiency when a forward link is non-degraded.

5. The wireless communication device of claim 4, wherein the processor is further configured to determine that the forward link is non-degraded based on a frame error rate.

6. The wireless communication device of claim 4, wherein the processor is further configured to determine that the forward link is non-degraded based on received signal strength indicator (RSSI).

7. The wireless communication device of claim 4, wherein the processor is further configured to determine that the forward link is degraded based on a forward power control signal generated by the wireless communication device.

8. The wireless communication device of claim 1, wherein:
the antenna has an antenna efficiency comprising a reception antenna efficiency for received signals received from a base station and a transmission antenna efficiency for transmitted signals transmitted to the base station;
the antenna matching circuit is responsive to the control signal to adjust a relationship between the transmission efficiency and the reception efficiency; and
the processor is further configured to generate the control signal based on a forward link quality of a forward link from the base station to the wireless communication device.

9. The wireless communication device of claim 8, wherein the processor is further configured to generate the control signal based on a reverse link quality of a reverse link from the wireless communication device to the base station.

10. The wireless communication device of claim 9, wherein the processor is further configured to:
shift the antenna efficiency to increase transmission antenna efficiency when the reverse link quality decreases relative to the forward link quality; and
shift the antenna efficiency to increase reception antenna efficiency when the forward link quality decreases relative to the reverse link quality.

11. The wireless communication device of claim 10, wherein the processor is configured to determine the reverse link quality based on the reverse link power control signal generated at the base station and transmitted to the wireless communication device.

12. The wireless communication device of claim 10, wherein the processor is configured to determine the forward link quality based on at least one of a frame error rate (FER) and a received signal strength indicator (RSSI).

13. The wireless communication device of claim 12, wherein the processor is configured to determine the forward link quality based on a forward power control signal generated at the wireless communication device and transmitted to the base station.

14. A wireless communication device comprising:
a radiating means for radiating electromagnetic signals;
a tunable impedance matching means for tuning an impedance match of the radiating means, the tunable impedance matching means connected to the radiating means;
a processing means for processing base band signals connected to the tunable impedance matching means, the processing means configured to receive a reverse power control signal from a base station and to tune the tunable impedance matching means responsive to the reverse power control signal.

15. The wireless communication device of claim 14, further comprising:
a memory means for storing a table, the table comprising power control indicia and corresponding tunable impedance matching means settings, and wherein the processing means is configured to identify power control indicia in the table corresponding to the reverse power control signal and tune the tunable impedance matching means to the corresponding tunable impedance matching means settings.

16. A method performed in a wireless communication device, the method comprising:
receiving a reverse power control signal from a base station;
adjusting an antenna matching circuit in response to the reverse power control signal to adjust an antenna efficiency; and
tuning the matching antenna circuit to increase antenna reception efficiency when the reverse power control signal indicates a non-degraded reverse link.

17. The method of claim 16, wherein the adjusting comprises:
tuning the matching antenna circuit to increase antenna transmission efficiency when the reverse power control signal indicates a degraded reverse link.

18. The method of claim 17, wherein the tuning the matching antenna circuit to increase antenna transmission efficiency further comprises:
tuning the matching antenna circuit to increase antenna transmission efficiency when a forward link is non-degraded.

19. The method of claim 18, further comprising:
determining the forward link is non-degraded based on a frame error rate.

20. The method of claim 18, further comprising:
determining the forward link is non-degraded based on received signal strength indicator (RSSI).

21. The method of claim 18, further comprising:
determining the forward link is degraded based on a forward power control signal generated by the wireless communication device.

* * * * *